United States Patent [19]

Gjertsen et al.

[11] Patent Number: 4,534,933
[45] Date of Patent: Aug. 13, 1985

[54] NUCLEAR REACTOR FUEL ASSEMBLY WITH IMPROVED TOP NOZZLE AND HOLD-DOWN MEANS

[75] Inventors: Robert K. Gjertsen, Monroeville; Luciano Veronesi, Pittsburgh, both of Pa.

[73] Assignee: Westinghouse Electric Corp., Pittsburgh, Pa.

[21] Appl. No.: 542,625

[22] Filed: Oct. 17, 1983

[51] Int. Cl.³ .............................. G21C 19/28
[52] U.S. Cl. ................... 376/364; 376/285; 376/353; 376/362
[58] Field of Search ............... 376/285, 353, 362, 364

[56] References Cited

U.S. PATENT DOCUMENTS

| 3,379,619 | 4/1968 | Andrews et al. | |
| 3,770,583 | 11/1973 | Klumb et al. | |
| 3,971,575 | 7/1976 | Lesham et al. | 376/364 X |
| 4,078,967 | 3/1978 | Anthony | 376/364 X |
| 4,192,716 | 3/1980 | Anthony | |
| 4,208,249 | 6/1980 | Jabsen | 376/285 |
| 4,278,501 | 7/1981 | Steinke | 376/364 |
| 4,321,111 | 3/1982 | Jabsen | 376/353 |
| 4,323,428 | 4/1982 | Schallenberger et al. | 376/353 |
| 4,326,921 | 4/1982 | Cadwell | 376/353 |
| 4,376,092 | 3/1983 | Kmock | 376/353 |

Primary Examiner—Peter A. Nelson
Attorney, Agent, or Firm—Douglas E. Erickson

[57] ABSTRACT

A nuclear reactor fuel assembly having an improved top nozzle subassembly with a hold-down device incorporated therewithin to prevent the force of the upward coolant flow from lifting the fuel assembly into damaging contact with the upper core support plate, while allowing for changes in fuel assembly length due to core-induced thermal expansion. The construction of the fuel assembly is such that its top surface can be placed in direct contact with the upper core plate. Thermal expansion of the components of the fuel assembly in the upward direction are accommodated within the top nozzle subassembly.

14 Claims, 3 Drawing Figures

NUCLEAR REACTOR FUEL ASSEMBLY WITH IMPROVED TOP NOZZLE AND HOLD-DOWN MEANS

CROSS REFERENCE TO RELATED APPLICATIONS

Reference is hereby made to the following copending applications dealing with related subject matter and assigned to the assignee of the present invention:

1. "Reconstituting A Nuclear Reactor Fuel Assembly" by Robert K. Gjertsen, John F. Wilson, and John M. Shallenberger; U.S. Ser. No. 564,056, filed Dec. 21, 1983.

2. "Nuclear Reactor Fuel Assembly With Fuel Rod Removal Means" by Robert K. Gjertsen, John F. Wilson, and Walter F. Weiland; U.S. Ser. No. 545,419, filed Oct. 25, 1983.

BACKGROUND OF THE INVENTION

The present invention relates generally to fuel assemblies for nuclear reactors and, more particularly, is directed to an improved top nozzle having hold-down means incorporated therewithin in forming a subassembly.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate. To facilitate handling and installation, the fuel assemblies are generally not secured to the lower core support plate.

Temperatures at various times within the core may vary greatly, such as, from cold shutdown to normal operating conditions. It is also a well-known fact that different materials exhibit different thermal growth characteristics. Therefore, since the materials used in the vertically extending support structures of the fuel assemblies are generally different than those used in the core support barrel, the thermal expansion of these various members in the axial or vertical direction may be quite significant, particularly, at the high temperatures found within the core and the axial length of some of the members. For these reasons, the fuel assemblies are not usually attached to the upper and lower core plates but rather are supported in a manner which permits some relative motion therebetween. The axial thermal expansion differential between the fuel assemblies and the core support barrel has been accommodated by insuring that the axial spacing between the upper and lower core support plates is somewhat greater than the axial length of the fuel assemblies. Normally, this is accomplished by providing an axial gap between the top of the fuel assemblies and the upper core support plates. Over the years, the axial gap spacing had to be increased due to the increasing temperatures in the core region, the increased length and different construction of the fuel assemblies, as well as from the use of different materials, such as Zircaloy. This axial gap spacing not only requires critical design tolerances and precise positioning of the upper core plate over the fuel assemblies, but also, as felt by many designers, permits cross flow of the upwardly flowing coolant in this upper region, subjecting some of the core elements to a potentially damaging side load.

Generally, in most reactors, a fluid coolant such as water, is directed upwardly through apertures in the lower core support plate and along the fuel rods of the various fuel assemblies to receive the thermal energy therefrom. The physical configuration of the fuel assemblies is such that the coolant may experience a significant pressure drop in passing upwardly through the core region. This pressure drop necessarily produces a lifting force on the fuel assemblies. In some instances, the weight of the fuel assembly is sufficient to overcome the upward hydraulic lifting forces under all operating conditions; however, this is often not the case, particularly when the coolant density is high, as at reactor start-up, and additionally because of increasing coolant flow rates. When the hydraulic forces in the upward direction on a particular fuel assembly are greater than the weight of that fuel assembly, the net resultant force on the fuel assembly will be in the upward direction, causing the assembly to move upward into contact with the upper core plate. This upward motion of the fuel assembly, if uncontrolled, may result in damage to the fuel assembly and the fuel rods or to the upper core plate and must, therefore, be avoided. In order to prevent hydraulic lifting of the fuel assemblies, various hold-down devices have been developed.

Once such hold-down device, as seen in U.S. Pat. No. 3,379,619, employs the use of leaf springs. The leaf springs are disposed in the axial gap, between the top of the fuel assembly and the upper core plate, which has been provided to accommodate for the thermal expansion of the fuel assembly. More particularly, the leaf springs are attached to the top flange of an enclosure structure having upstanding sidewalls and a bottom adapter plate, with the adapter plate being attached to the upper ends of the control rod guide thimbles. The leaf springs are held in a state of compression within the axial gap and cooperate with the upper core plate to prevent the fuel assembly from being moved upwardly, by the hydraulic lifting forces of the coolant, into damaging contact with the core plate, while, at the same time, allow for thermal expansion of the fuel assembly into the axial gap. The integrally formed top flange on the enclosure not only provides a physical location for mounting the leaf springs, but also provides a surface for alignment holes that interface with pins projecting down the upper core plate. In addition, the enclosure provides convenient means for physically handling the fuel assembly during installation and removal; protects the fuel assembly from side loading; and, one of its primary purposes, channel the fluid coolant upwardly to prevent cross flow at the top portion of the fuel assembly. Although the leaf spring hold-down device has many advantages, it necessitates the requirement of an axial gap to provide for thermal expansion, and further, requires physical space for mounting the leaf springs. In some fuel assemblies, especially in some of the more newer designs with different fuel rod arrangements and configurations, there is not sufficient physical space to mount the leaf springs.

Another type of hold-down device, such as the one shown in the Klumb et al. patent (U.S. Pat. No. 3,770,583), employs the use of coil springs. The device basically includes coil springs disposed about upright alignment posts having one end threadably secured to the top end plate of a fuel assembly, which in turn, is mounted on the upper ends of the control rod guide tubes. A hold-down plate is slidably mounted on the alignment posts and the coil springs are interposed between the two plates. The upper ends of the alignment posts are radially enlarged to form shoulders for retaining the hold-down plate on the posts. In use, the coil springs bias the hold-down plate upwardly against a core alignment plate to provide a downward force on the fuel assembly. To accommodate for thermal expansion of the fuel assembly, it is mandatory that aligned clearance holes be provided in the upper core plate for upward movement of the enlarged shoulders of the alignment posts. Machining of such clearance holes is not only costly, but also weakens the upper core plate structure. Furthermore, the arrangement lacks an enclosure structure to prevent cross flow of the coolant in the upper region of the fuel assembly.

Two modified versions of the coil spring hold-down device seen in the Klumb et al. patent, can be seen in FIGS. 3 and 3a of the Anthony patent (U.S. Pat. No. 4,192,716). The version represented in FIG. 3 is essentially the same as the Klumb et al. device, with the difference being the provision of an axial gap between the top of the fuel assembly and the upper core plate. The FIG. 3a also requires an axial gap spacing to accommodate for thermal expansion. Hydraulic lift is prevented by coil springs, seated in cavities in the upper core plate, that cooperate with an alignment pin arrangement. Both of these versions suffer from some of the same shortcomings as the Klumb et al. device in addition to the disadvantage associated with an axial gap spacing.

SUMMARY OF THE INVENTION

Briefly stated, the present invention is directed towards a nuclear reactor fuel assembly having a bottom nozzle, at least one longitudinally extending control rod guide thimble attached to and projecting upwardly from the bottom nozzle, a plurality of transverse grids axially spaced along the guide thimble for supporting an array of upstanding fuel rods, and a top nozzle subassembly adapted to be attached to the upper end portion of the guide thimble for completing the assembly as an integral unit. The top nozzle includes hold-down means incorporated therewithin in providing a hold-down force to prevent hydraulic lifting of the fuel assembly caused by upward coolant flow while allowing for changes in fuel assembly length due to core-induced thermal expansion and the like. The construction is such that the fuel assembly can be placed in the core region with its top surface in direct contact with the upper core plate and thereby eliminating the potential of coolant cross flow in the axial gap spacing required by some of the prior art units and the provision of costly machined cavities in the upper core plate to accommodate for thermal expansion in other ones of the prior art units.

The top nozzle with its hold-down means basically comprises a coil spring disposed about the upper end of the guide thimble and sandwiched between a lower adapter plate and an upper hold-down plate. The lower adapter plate is slidably mounted on the guide thimble and its downward movement is limited by a retainer mounted on the guide thimble. The upper hold-down plate has a guide thimble passageway with an internal ledge defined therewithin for receiving the thimble so as to mount the hold-down plate on the thimble for slidable movement therealong. A second retainer on the upper end of the guide thimble is disposed within the passageway of the hold-down plate and cooperates with the internal ledge to limit the upward movement of the hold-down plate along the guide thimble. The construction is such that the terminal upper end of the guide thimble, along with the second retainer, are permitted to reciprocate within the passageway of the hold-down plate, thus allowing for thermal growth of the guide thimble.

In the preferred embodiment, there are several guide thimbles, separate guide thimble extensions connected to the upper ends of each of the guide thimbles, and the top nozzle subassembly is attached to the thimble extensions. Preferably, the coil springs are preloaded, being held in compression between the lower adapter plate and the upper hold-down plate. Further, it is preferred, that the lower adapter plate has upstanding sidewalls formed on the peripheral edges thereof in defining an enclosure for channeling the coolant flow upwardly at the upper end region of the fuel assembly. Still further, it is preferred that the upper hold-down plate be of a cross-sectional shape and size to be received by the enclosure defined by the sidewalls and that alignment tabs be provided along the outer edges of the hold-down plate to be received by a corresponding number of guide channels on the inner side of the sidewalls to facilitate proper alignment of the hold-down plate as it is received within the enclosure and to add structural rigidity to the top nozzle.

The present invention further includes, wherein the fuel assembly and the top nozzle have rectangular cross sections, an axially extending recess formed in each of the exterior corners defined by a pair of adjacent enclosure sidewalls and which recess is adapted to receive at least a portion of an alignment pin that projects down from an upper core plate which overlies the fuel assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
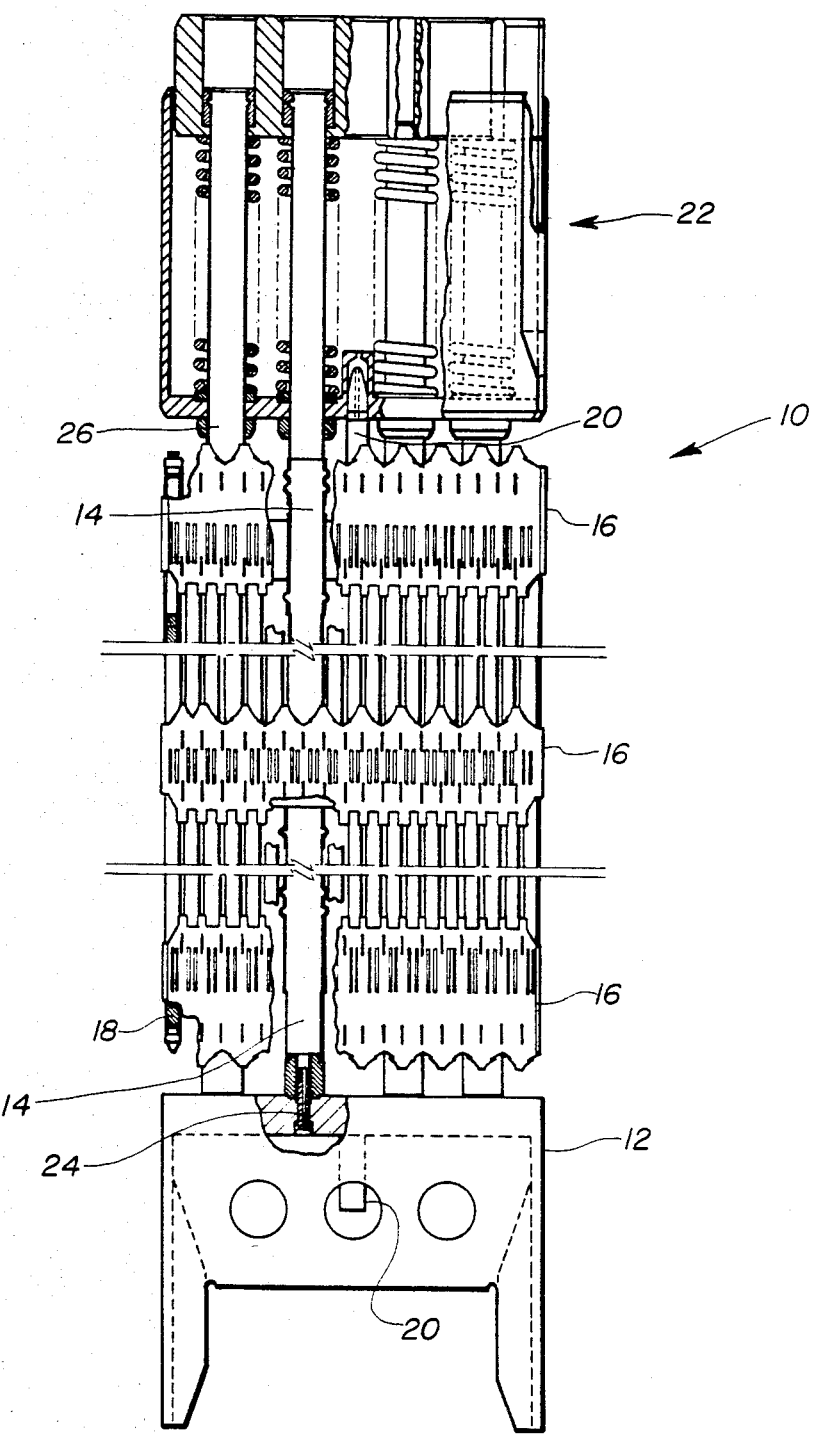
FIG. 1 is a partially sectioned elevational view, with parts being broken away for clarity, of a fuel assembly formed in accordance with the principles of the present invention.

In the following description, like reference characters designate like or corresponding parts throughout the several views. Also, in the following description, it is to be understood that such terms as "forward", "rearward", "left", "right", "upwardly", "downwardly" and the like, are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well-known practices, being indicated generally by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown); an organized array of longitudinally extending control rod guide tubes or thimbles 14 projecting upwardly from the bottom nozzle 12; a plurality of transverse grids 16 axially spaced along the guide thimble 14; and a multiplicity of elongated fuel rods 18 (only one of which being shown for clarity) transversely spaced and axially supported by the grids 16. It should be pointed out here that, in this embodiment, the lower ends of the elongated fuel rods 18 are shown being axially held and spaced above the bottom nozzle 12, however, they may be restably supported on the upper surface of the bottom nozzle 12. An instrumentation tube 20 is located at the center of the fuel assembly 10. Attached to the upper ends of the guide thimbles 14 is an end structure or top nozzle with hold-down means incorporated therewithin, generally designated by the numeral 22, to form an integral assembly capable of being conventionally handled without damaging the assembly components. A detailed description of the top nozzle 22 will be provided later on in the specification.

To form the fuel assembly 10, the transverse grids 16 are attached to the longitudinally extending guide thimbles 14 at predetermined axially spaced locations; the fuel rods 18 are inserted from below through the grids 16; the lower nozzle 12 is then suitably attached, such as by machine screws 24, to the lower ends of the guide thimbles; and then the top nozzle 22 is attached to the upper end portions of the guide thimbles 14. To control the fission process, a multiplicity of control rods (not shown) are reciprocally movable in the control rod guide thimbles 14 of the fuel assembly 10.

Before describing the top nozzle 22 in detail, it should be noted that the fuel assembly 10 depicted in the drawings is of the type having a square array (19×19) of fuel rods 18 with sixteen control rod guide thimbles 14 strategically arranged within the fuel rod array. Further, the bottom nozzle 12 and likewise the top nozzle 22 are generally square in cross section. In that the specific fuel assembly represented in the drawings is for illustrational purposes only, it is to be understood that neither the shape of the nozzles nor the number and/or arrangement configuration of the fuel rods and guide thimbles are to be limiting and that the invention is equally applicable to different shapes and arrangement configurations than the ones shown.

Top Nozzle With Hold-Down Means

In the preferred embodiment, each of the control rod guide thimbles 14 has a separate guide thimble extension 26 connected to the upper end of the guide thimble 14 in forming a normal extension to the guide thimble. The guide thimble extension 26, referred to hereafter as thimble extension, is coaxial, has a diameter of substantially the same size as the guide thimble 14, and preferably is connected to the upper end of the guide thimble 14 by a suitable mechanical connection, such as, by bulge-fitting which is well known in the art. In describing the top nozzle with hold-down means 22, reference will be made to the manner in which it is attached to the thimble extension 26, however, it can be appreciated that the top nozzle with hold-down means 22 could be attached in the same manner directly to the upper ends of the thimbles 14 rather than the thimble extension 26, and thus the principles of the invention are equally applicable to such an arrangement.

Figure 2:
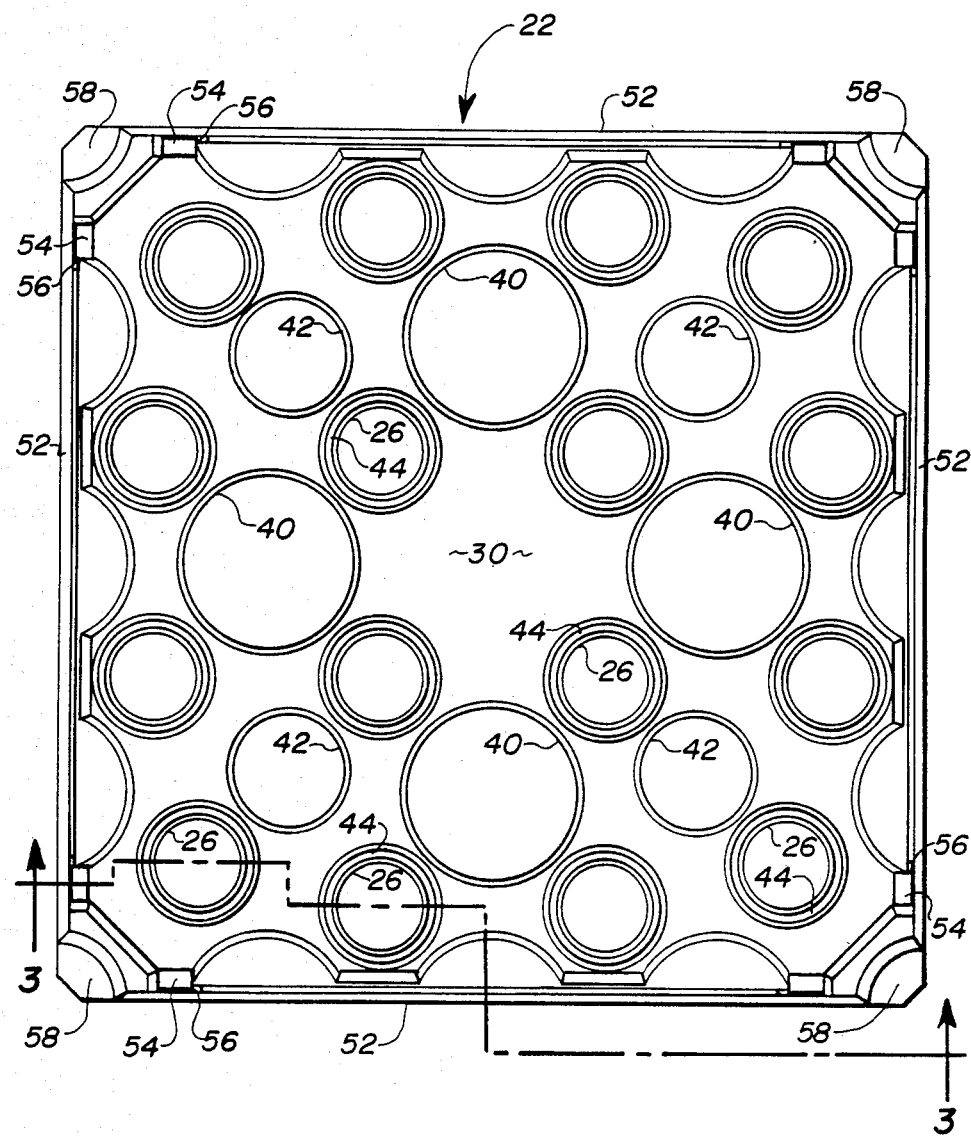
FIG. 2 is an enlarged top plan view of the fuel assembly shown in FIG. 1.
Figure 3:
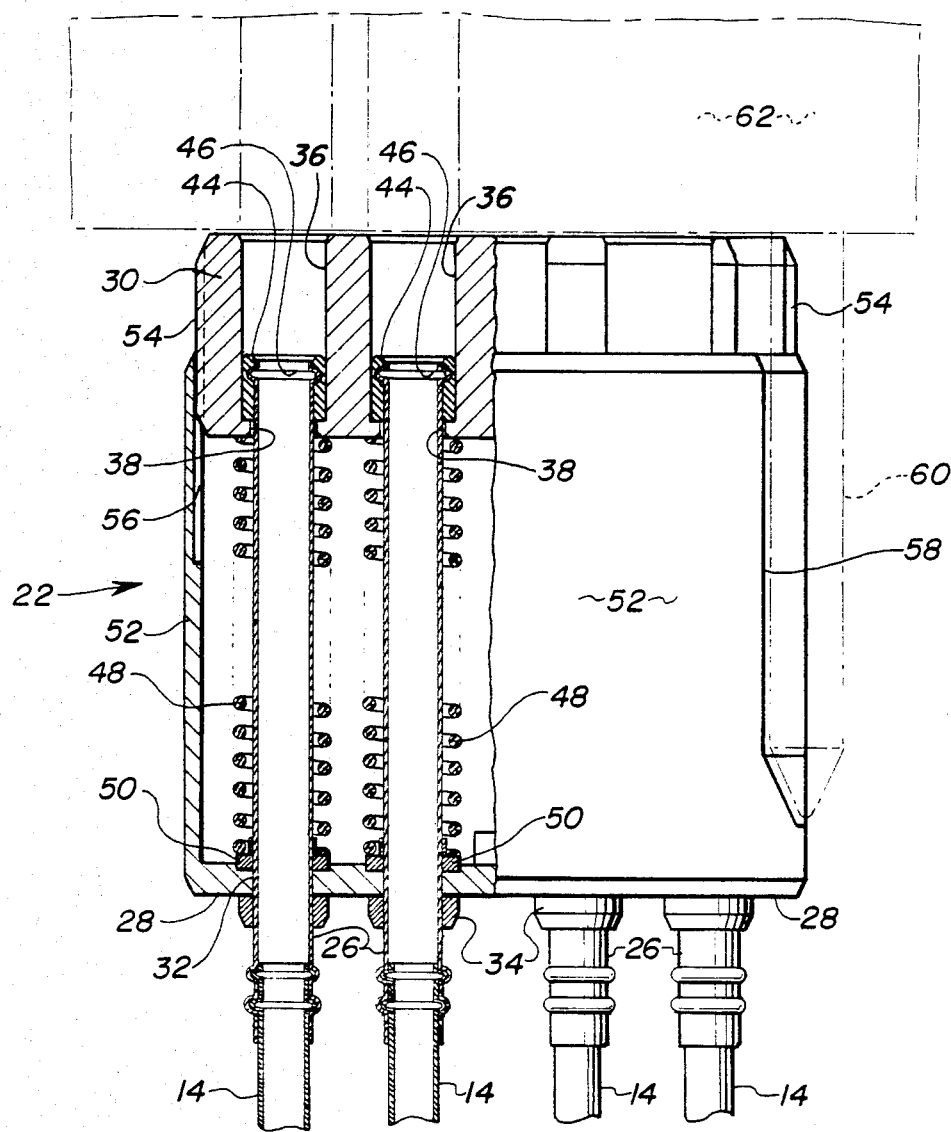
FIG. 3 is an enlarged sectional view, as taken along line 3—3 of FIG. 2, of the top nozzle, being removed from the fuel assembly, showing the guide thimble extensions being connected to the guide thimbles and with an upper core plate having a downwardly projecting alignment prong, being represented by phantom lines, overlying the top nozzle assembly to illustrate the mating relationship of an alignment prong with the recesses formed in the corner of the top nozzle.

As best seen in FIG. 3, the top nozzle with hold-down means 22 (referred to hereinafter as a top nozzle for simplicity) includes a lower adapter plate 28 and an upper hold-down plate 30. The lower adapter plate 28 is of conventional construction formed of a plurality of cross-laced bars (not shown) defining a coolant flow openings (not shown) and is provided with a number of through holes 32 corresponding to the number of thimble extensions 26. The holes 32 are of sufficient dimensional size and are positioned according to the arrangement of the thimble extensions 26 such that the adapter plate 28 can be slidably mounted on the thimble extensions 26. To limit the downward slidable movement of the adapter plate 28 along the thimble extensions 26, a suitable retainer, such as a ring 34 which encircles the thimble extension, is suitably fastened, by brazing or the like, to each of the thimble extensions 26 at a predetermined location, axially spaced above the connection of the thimble extension 26 to the thimble 14. The upper hold-down plate 30 is of a thickness substantially greater than the thickness of the lower adapter plate 28 and is provided with passageways 36 for receiving the thimble extensions 26. Each passageway 36 has a generally constant larger diameter upper segment and a generally constant smaller diameter lower segment, with the lower segment defining an internal ledge 38 and being slidably engageable with the thimble extension 26. The height of the upper segment is substantially greater than the height of the lower segment of the passageway 36. The passageways 36 are formed in the hold-down plate 30 by a through bore and a coaxial counterbore of a larger diameter than the diameter of the through bore, the transition between the through bore and the counterbore defining the internal ledge 38. As best seen in FIG. 2, the hold-down plate 30 is also provided with a number of relatively large coolant, flow openings 40 and several smaller coolant flow openings 42 positioned at predetermined locations about the plate.

Again referring to FIG. 3, the upper end of each of the thimble extensions 26 is provided with a retainer, preferably in the form of a collar 44 which encircles the end of the thimble extension and is disposed within the upper segment of the passageway 36. In the preferred embodiment, the collar 44 is provided with an internal annular groove 46 in the upper portion thereof and is attached to the thimble extension 26 by circumferentially bulging the thimble extension 26 into the internal collar groove 46. As can be appreciated, the abutting engagement of the upper surface of the internal ledge 38 of the hold-down plate passageway 36 with the lower edge of the retainer collar 44 limits the upward slidable movement of the hold-down plate 30 along the thimble extensions 26.

The top nozzle 22 further includes a coil spring 48 disposed on each of the thimble extensions 26 and interposed between the lower surface of the upper hold-down plate 30 and the upper surface of the lower adapter plate 28. Preferably, the coil springs 48 are held in compression between the upper hold-down plate 30 and lower adapter plate 28 to preload the fuel assembly 10. For proper alignment of the coil springs 48 and to prevent them from contacting their respective thimble extension 26, a spring seat 50 is provided on the lower end of each of the coil springs 48. The spring seats 50 set in recesses or counterbores provided in the upper surface of the lower adapter plate 28. Each of the spring seats 50 has an inner integral upstanding flange that extends between the outer wall of the thimble extension 26 and the inner surface of the spring 48.

As best seen in FIGS. 2 and 3, the preferred embodiment of the top nozzle 22 further includes upstanding sidewalls 52 formed on the peripheral edge of the lower adapter plate 28 in defining an enclosure (sometimes referred to as an envelope or can) that surrounds the thimble extensions 26 and their associated coil springs 48. As mentioned earlier in the specification, the top nozzle 22 has a rectangular or square cross-sectional shape, and thus, it follows that the enclosure defined by the upstanding sidewalls 52 has a square cross-sectional shape. Preferably, the hold-down plate 30 also has a square cross-sectional shape and is of a dimensional size slightly less than that of the enclosure 52 so that the hold-down plate 30 can be received within the enclosure 52. In providing proper alignment and to facilitate the insertion of the hold-down plate into the enclosure 52, outwardly projecting alignment tabs 54 (see FIG. 2) are provided on the peripheral edges of the hold-down plate 30 for mating or interfitting engagement with a corresponding number of axially extending guide channels 56 formed in the inner side of the sidewalls 52. Preferably, a pair of transversely spaced guide channels 56 are provided on each of the four sidewalls of the enclosure 52 such that one guide channel on one sidewall and another guide channel on an adjacent sidewall is associated with each of the four corners of the enclosure 52.

In providing lateral support to the fuel assembly 10, when placed in the core region of a reactor (not shown), a depression or recess 58 is formed in the lateral periphery of each of the axial extending corners defined by the sidewalls 52 of the top nozzle 22. Preferably, the recesses 58 are of a shape or configuration to slidably receive at least a portion of an alignment pin 60, such as the one represented in phantom lines in FIG. 3, that projects downwardly from an upper core plate 62 which overlies the fuel assembly 10.

As shown in FIG. 3, the top nozzle subassembly 22 is attached to the upper end portions of thimbles 14 to form fuel assembly 10 as follows: The retainer rings 34 are first mounted on the thimble extensions 26; the lower adapter plate 28 with its integrally formed sidewalls defining enclosure 52 is lowered down onto the extension thimbles 26, via the holes 32, and is supported on the top surface of the retainer rings 34; the spring seats 50 are inserted over the thimble extensions and seated in the counterbore cavities provided in the top surface of the adapter plate 28; the coil springs 48 are then inserted over the thimble extensions 26 with their lower ends resting on the top of spring seats 50 and radially spaced from the thimble extension by the seat flange; then the upper hold-down plate 30, via passageways 36, is inserted onto the thimble extensions 26, being assisted by tabs 54 mating with the guide channels 56; downward pressure is then applied to compress the springs (initially, springs 48 are in a freestanding condition) to a predetermined position wherein a desired spring compressive preload is attained (the span between the hold-down plate 30 upper surface and the adapter plate 28 lower surface is the control); collars 44 are then inserted into the upper segments of passageways 36 and around the ends of the thimble extensions 26; the thimble extension ends are bulge-fitted into the annular grooves 46 of collars 44, and then the pressure is released whereupon the springs expand, forcing the hold-down plate 30 upwardly along the thimble extensions 26 to an axial location wherein the internal ledge 38 abuts collar 44. As seen, the coil springs 48 are held captive, in compression, between the hold-down plate 30 and adapter plate 28 to preload the fuel assembly 10.

Briefly, while still referring to FIG. 3, the operation of the fuel assembly 10 in response to thermal expansion and hydraulic lifting forces is as follows: As the guide thimble 14 and the thimble extensions 26 along therewith grow linearly, due to increased temperatures, the upper terminal end of the thimble extensions 26 with its attached collar 44 move upwardly within the upper segment of passageway 36, and, as the temperature decreases and the thimble and extension retract in length, the terminal end and collar move downwardly within the passageway (reciprocal movement). Now, with regards to hydraulic lifting, should the force of the upward coolant flow tend to exceed the weight of the assembly 10 and the preloaded force of the coil springs 48, the adapter plate 28 tends to move upwardly, further biasing the spring 48 against the hold-down plate 30, resulting in a net downward force applied against the fuel assembly 10.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

We claim:

1. A fuel assembly for a nuclear reactor including a bottom nozzle, at least one longitudinally extending control rod guide thimble attached to and projecting upwardly from the bottom nozzle, a plurality of transverse grids axially spaced along said thimble for supporting an array of upstanding fuel rods, and an improved top nozzle with hold-down means attached to the upper end of said thimble in forming an integral assembly, said improved top nozzle with hold-down means comprising:
   (a) a lower adapter plate having a guide thimble hole for receiving said guide thimble so as to mount said adapter plate on said guide thimble for slidable movement therealong;
   (b) first retainer means on said thimble for limiting downward movement of said adapter plate along said thimble, (c) an upper hold-down plate having a guide thimble passageway with an internal ledge for receiving said thimble so as to mount said hold-down plate on said thimble for slidable movement therealong, said internal ledge being located in a lower portion of said passageway;

(d) second retainer means on said thimble being disposed within said passageway above said ledge therein and cooperable with said ledge for limiting the upward movement of said hold-down plate along said thimble; and (e) spring means coiled about said thimble and interposed between said lower adapter plate and said upper hold-down plate for yieldably retaining said ledge in abutting engagement with said second retainer means.

2. The fuel assembly as defined in claim 1, wherein said spring means is a coil spring held in compression between said lower adapter plate and said upper hold-down plate.

3. The fuel assembly as defined in claim 2, wherein said first retainer means includes an annular ring disposed around and mounted to said thimble for abutting engagement with an undersurface of said lower adapter plate.

4. The fuel assembly as defined in claim 1, wherein said second retainer means includes a collar disposed about and attached to said thimble.

5. The fuel assembly as defined in claim 4, wherein said collar has an internal annular groove and said thimble is bulge-fitted into said groove.

6. The fuel assembly as defined in claim 1, wherein said passageway is defined by a lower bore and an upper counterbore through said hold-down plate, said counterbore being coaxial with, and of a larger diameter than the diameter of, said bore, the transition between said bore and said counterbore defining said internal ledge in said lower portion of said passageway.

7. The fuel assembly as defined in claim 6, wherein the depth of said counterbore is greater in axial length than the axial height of said second retainer means.

8. A fuel assembly for a nuclear reactor including a bottom nozzle, at least one longitudinally extending control rod guide thimble attached to and projecting upwardly from the bottom nozzle, a plurality of transverse grids axially spaced along said thimble for supporting an array of upstanding fuel rods, and an improved top nozzle with hold-down means attached to the upper end of said thimble in forming an integral assembly, said improved top nozzle with hold-down means comprising:

(a) a lower adapter plate having a guide thimble hole for receiving said guide thimble upper end so as to mount said adapter plate on said guide thimble upper end for slidable movement therealong;

(b) upstanding interconnected sidewalls mounted on said lower adapter plate so as to define therewith an open enclosure surrounding said upper end of said thimble;

(c) first retainer means on said thimble below said adapter plate for limiting downward movement of said adapter plate along said thimble upper end;

(d) an upper hold-down plate having a guide thimble passageway and an internal ledge defined on said plate within said passageway, said passageway for receiving said thimble upppr end so as to mount said hold-down plate on said thimble upper end for slidable movement therealong, said hold-down plate having a shape in cross section conforming to the shape in cross section defined by said open enclosure and of a dimensional size less than that of said enclosure such that said hold-down plate is received within said enclosure;

(e) second retainer means on said thimble upper end being disposed within said passageway above said ledge therein and cooperable with said ledge for limiting the upward movement of said hold-down plate along said thimble upper end; and (f) spring means coiled about said thimble upper end and interposed between said lower adapter plate and said upper hold-down plate for yieldably retaining said ledge in abutting engagement with said second retainer means.

9. The fuel assembly as defined in claim 8, wherein said sidewalls define a rectangular-shaped open enclosure and said hold-down plate has a rectangular shape of a dimensional size less than that of said enclosure such that said hold-down plate can be received within said enclosure.

10. The fuel assembly as defined in claim 9, wherein each sidewall of said enclosure is provided with at least one recess formed in the exterior of said sidewall and adapted to accept at least a portion of an alignment pin projecting downwardly from a core support plate.

11. The fuel assembly as defined in claim 9, wherein each corner defined by the adjacent sidewalls of said rectangular enclosure is provided with a recess adapted to accept an alignment pin projecting downwardly from a core support plate.

12. The fuel assembly as defined in claim 11, wherein each of said recess comprises one-quarter of a cylindrical void.

13. The fuel assembly as defined in claim 1, further including a control rod guide thimble extension having a lower end and an upper end with said lower end being connected to the upper end of said guide thimble and said improved nozzle with hold-down means being attached to the upper end of said guide thimble extension.

14. A fuel assembly for a nuclear reactor including a bottom nozzle, at least one longitudinally extending control rod guide thimble attached to and projecting upwardly from the bottom nozzle, a plurality of transverse grids axially spaced along said thimble for supporting an array of upstanding fuel rods, and an improved top nozzle with hold-down means attached to the upper end of said thimble in forming an integral assembly, said improved top nozzle with hold-down means comprising:

(a) a lower adapter plate having a guide thimble hole for receiving said upper end of said guide thimble so as to mount said adapter plate on said guide thimble upper end for slidable movement therealong;

(b) upstanding interconnected sidewalls mounted on a peripheral edge of said lower adapter plate so as to define therewith an open enclosure surrounding said upper end of said thimble, said each sidewall including at least one axially extending guide channel on an inner side of said sidewall;

(c) first retainer means on said thimble below said adapter plate for limiting downward movement of said adapter plate along said thimble upper end;

(d) an upper hold-down plate having a guide thimble passageway and an internal ledge defined on said plate within said passageway, said passageway for receiving said thimble upper end so as to mount said hold-down plate on said thimble upper end for slidable movement therealong, said hold-down plate having a shape in cross section conforming to the shape in cross section defined by said open enclosure and of a dimensional size less than that of said enclosure such that said hold-down plate is received within said enclosure, said hold-down plate including a corresponding number of alignment tabs projecting outwardly from its peripheral edge for slidable engagement ith said guide channels on said inner side of said sidewalls to facilitate proper alignment of said hold-down plate within said enclosure;

(e) second retainer means on said thimble upper end being disposed within said passageway above said ledge therein and cooperable with said ledge for limiting the upward movement of said hold-down plate along said thimble upper end; and (f) spring means coiled about said thimble upper end and interposed between said lower adapter plate and said upper hold-down plate for yieldably retaining said ledge in abutting engagement with said second retainer means.

* * * * *